United States Patent [19]
Woloszyk

[11] 3,792,328
[45] Feb. 12, 1974

[54] D.C. MOTOR SPEED CONTROL
[75] Inventor: Leonard T. Woloszyk, Greendale, Wis.
[73] Assignee: Lakeside Manufacturing Inc., Milwaukee, Wis.
[22] Filed: Feb. 23, 1973
[21] Appl. No.: 335,054

[52] U.S. Cl................. 318/139, 318/305, 318/348
[51] Int. Cl. ............................................. H02p 5/06
[58] Field of Search ... 318/139, 269, 258, 305, 343, 318/347, 348, 379, 380, 418

[56] References Cited
UNITED STATES PATENTS
2,712,625   7/1955   Blitz.................................. 318/347
2,757,329   7/1956   Lichtenfels ........................ 318/380

*Primary Examiner*—Bernard A. Gilheany
*Assistant Examiner*—Thomas Langer
*Attorney, Agent, or Firm*—Arthur H. Seidel; Barry E. Sammons

[57] ABSTRACT

A speed control for a D.C. motor has a resistance connectable in series with an energy source and the motor armature for starting the motor, a series of voltage dropping diodes connectable in parallel with the resistance for slow speed operation, and switching connections for effectively removing the resistance and the diodes from the armature circuit for high speed operation. Dynamic braking of the motor is also provided when the motor armature is disconnected from the energy source.

10 Claims, 3 Drawing Figures

PATENTED FEB 12 1974 3,792,328

3,792,328

1

D.C. MOTOR SPEED CONTROL

BACKGROUND OF THE INVENTION

The present invention relates to a speed control for a D.C. motor that is suitable for the operation of an electrically powered wheelchair and like devices.

There are a variety of methods for controlling the speed of a D.C. motor. Basically, such methods consist of either (1) changing the field strength of the motor, (2) varying the armature voltage, (3) gating the amount of armature current by SCR control, (4) changing the effective brush position, or (5) varying a resistance in the armature circuit. For D.C. motors of a size such as used in driving wheelchairs it would be advantageous to use the latter method of varying armature circuit resistance. A wheelchair need not require more than two or three steps of speed control, and this could be achieved by switching values of fixed resistance into and out of the armature circuit. A resistance absorbs a part of the source voltage and thus effectively lowers the armature voltage, with a resultant reduction in motor speed for a given load condition. This method of controlling motor speed by varying armature circuit resistance permits the utilization of a relatively inexpensive permanent magnet, fixed field excitation type motor, and the armature voltage may be supplied from a standard energy cell. Although the simple insertion of a fixed resistance into an armature circuit is effective to produce a reduced speed, it also has the disadvantage of decreasing maximum available motor torque. Thus, a motor for driving a wheelchair that has an appreciable resistance in its armature circuit may stall, or never turn over, under a relatively large load, such as is encountered on a deep pile carpeting or in ascending an inclined surface.

The problem in operating a wheelchair is that the load to be propelled can vary over a wide range. The occupant may be small or large. The chair may be called upon to start-up on a downgrade requiring little accelerating force, or conversely on an upward incline requiring much greater initial torque. Then too, the surface condition over which the wheelchair rides can materially alter the driving torque requirements. Successful adaptation of a speed control utilizing resistances of a fixed value in the motor armature circuit becomes difficult, if a simple one or two step speed control arrangement is to be utilized. It is a solution of this problem to which the disclosure herein is directed.

SUMMARY OF THE INVENTION

The present invention resides in a speed control for a D. C. motor having a resistive element that is connected in series with the motor armature upon actuation of accompanying control switching, a voltage absorbing diode string connected in shunt relation to the resistive element upon further actuation of the accompanying control switching, and a direct connection between the motor armature and an energy source upon yet further actuation of the control switching.

The invention modifies the method of D.C. motor control based on variation in armature circuit resistance. For starting, a resistance is inserted in the armature circuit by the initial manual movement of a speed control member. Current inrush, before motor counter electromotive force is developed, is limited by the resistance and this eliminates any sudden application of excessive starting torque which might otherwise cause an objectionable abrupt start. Such a control is essential for a wheelchair, where the user may be of infirm age or an invalid that needs a feeling of security in operating the chair. The problem of the resistance limiting total available torque, such that for large loads start-up or speed cannot be initiated or maintained, is overcome by shunting the resistance with diodes. These diodes are brought into shunting relation by a continued motion of the manual speed control member. They function to increase the current available to the motor armature. The characteristic of the control circuit now makes more torque available for starting or for maintaining movement, but with a torque-speed characteristic that the higher speeds are not attained after the inertia of the load is overcome.

For higher speed, the manual speed control member can be fully advanced to place the motor armature directly across the voltage source. The control circuit can also include additional switching for placing the resistance across the motor armature when the motor is disconnected from the voltage source. Dynamic braking is thus attained by returning the speed control member back to zero speed, or stop, position. A smooth, prompt deceleration occurs which gives the user of the wheelcir a secure feeling of control over the chair, while not jerking, or unduly making an abrupt halt. Also, the chair will not run away on an incline before a manual parking brake can be set. It is a particular discovery that for wheelchair operation the resistance for obtaining low speed also functions well as the dynamic braking resistance.

It is an object of the invention to provide a speed control for a D.C. motor that provides a reduction in motor speed without severely limiting available motor torque.

Another object of the invention is to provide a step-type speed control for a D.C. motor inserting a fixed resistance into the armature circuit that is inexpensive, simple in design and reliable in operation.

Another object of the invention is to provide a speed control for a D.C. motor that furnishes a smooth operation satisfactory for a wheelchair.

Another object of the invention is to provide a speed control for a D.C. motor that is actuable through a series of stepped switching functions.

The foregoing and other objects and advantages of the invention will appear from the following description. In the description reference is made to the accompanying drawing, which forms a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
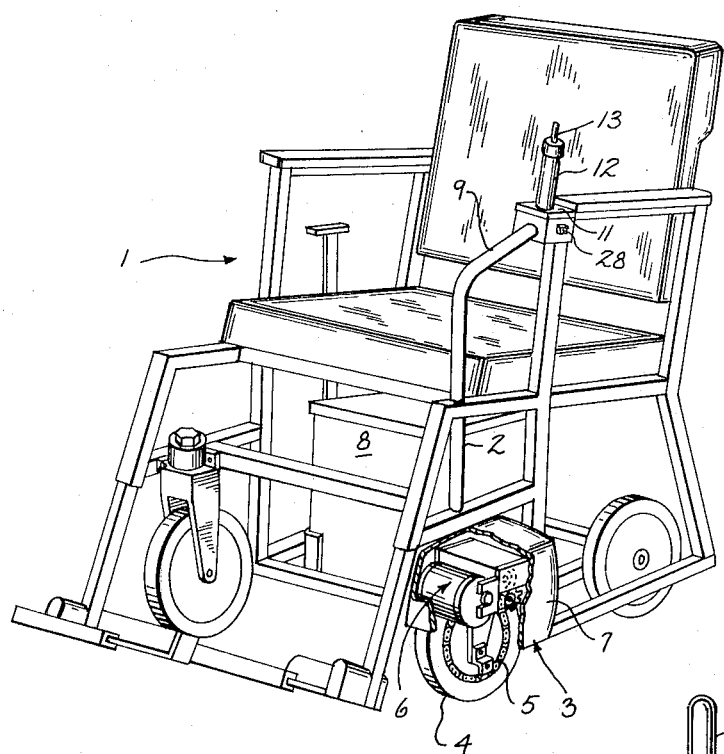
FIG. 1 is a view in perspective of a motorized wheelchair utilizing a motor speed control embodying the present invention.

FIG. 1 shows a motorized wheelchair 1 that is more fully described in co-pending United States application for Letters Patent Ser. No. 281,081, filed Aug. 16, 1972 and entitled "Self-Propelled Wheelchair." The wheelchair 1 has a vertical, pivotally mounted steering shaft 2 located at the front and on the left side of the vehicle. A steerable power unit 3 is mounted on the lower end of the shaft 2 which includes a drive wheel 4 driven through a chain 5 by a D.C. motor 6 having a fixed, permanent magnet field. A lightweight cover 7 normally shrouds the power unit 3, and a storage battery housed in a container 8 provides an energy source for the motor 6.

The steering shaft 2 turns rearwardly at its upper end to present a tiller arm 9 for turning the shaft 2 and the steerable power unit 3. The tiller arm 9 terminates in a control box 10, which is shown on an enlarged scale in FIG. 2. The box 10 has a removable cover 11 which mounts a vertical steering handle 12. The handle 12 is hollow, and surrounds a vertically depressible, manually operable speed control member 13. The rod-like control member 13 is biased upward by a spring 14 to the position shown in FIG. 2.

Figure 2:
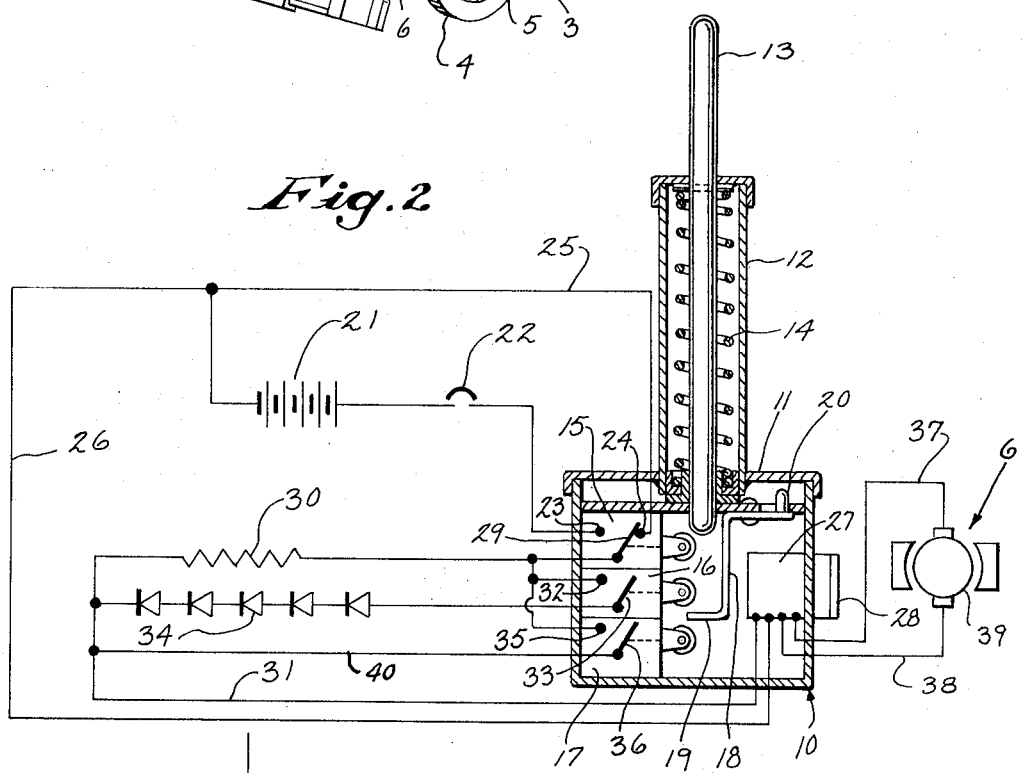
FIG. 2 is a schematic wiring diagram of the motor speed control embodying the present invention which includes a showing of a control box and operating handle in vertical section.

Referring specifically to FIG. 2, the control box 10 houses a set of three speed selector switches 15, 16 and 17 tiered one above the other. Roller type operating heads of the switches 15-17 extend into the downward path of travel of the speed control member 13, which may be depressed so that its lower end successively moves against the switch operating heads. The switches 15-17 form a portion of the speed control circuit of the present invention, and their actuation determines the speed at which the wheelchair 1 will be driven by the motor 6.

A pivoted lever 18 is mounted inside the control box 10 that has a lower tip 19. This tip 19 may be swung into and out of the vertical path of travel of the rod-like control member 13 by actuation of a finger 20 at the top of the lever 18. Access to the finger 20, for moving the lever 18, is afforded by removal of the cover 11, and when the lever tip 19 is in the position shown in FIG. 2 the rod-like speed control member 13 is blocked from operation of the lowermost speed selector switch 17.

Referring further to the schematic wiring diagram of FIG. 2, a standard 12-volt battery, or energy cell, contained in the battery case of FIG. 1, is referred to by the numeral 21. The positive side of the battery 21 connects through a circuit breaker 22 to a normally open contact 23 of the first speed selector switch 15. A normally closed contact 24 of the switch 15 connects through a lead 25 to the negative side of the battery 21, and a lead 26 connects from the negative battery side to a double throw reversing switch 27 mounted within the control box 10. As shown in both FIGS. 1 and 2, a manually operable lever 28 of the reversing switch 27 protrudes through a side wall of the control box 10 in a position convenient to the user of the wheelchair 1.

A movable contact 29 of the first speed selector switch 15 is connected to one end of a resistor 30, and the opposite end of the resistor 30 connects through a lead 31 to the reversing switch 27.

A normally open contact 32 of the second speed selector switch 16 is joined to the movable contact 29 of the first switch 15, and the movable contact 33 of the second switch 16 is connected to one end of a string of five diodes 34 connected in series. The other end of the string of diodes 34 is connected to the lead 31. A normally open contact 35 of the third speed selector switch 17 is connected to both the open contact 32 of the second switch 16 and the movable contact 29 of the first switch 15. A movable contact 36 of the third switch 17 is joined through a shorting lead 40 to the lead 31.

The reversing switch 27 has two output leads 37 and 38 that connect to the armature 39 of the motor 6. By operation of the switch 27 the direction of rotation of the motor 6 may be reversed, and by locating the switch 27 in electrical succession to the motor the polarities of the leads 26 and 31 and the remainder of the circuit are retained the same at all times. Thus, the positive terminal of the battery 21 is permanently connected to the anodes of the string of diodes 34 regardless of the direction of motor rotation.

For operation and control of the motor 6, the steering handle 12 is designed to be grasped with the palm and fingers of one hand, leaving the thumb free to depress the rod-like control member 13. As the member 13 is depressed, it successively engages the operating heads of the switches 15-17, furnishing a three stage speed control that consists of a first "start" stage, a second "low speed" stage and a third "high speed" stage. The member 13 may be depressed incrementally, to allow the motor 6 to operate in any selected one of these three speed control stages, or the member 13 may be rapidly depressed to the particular stage of control desired. Upon an initial incremental depression of the member 13, it engages the operating head of the upper, or first, speed selector switch 15 to open the normally closed contact 24 and close the normally open contact 23. This closure of the contact 23 connects the resistor 30 in series with the motor armature 39 and the battery 21. Armature current begins flowing from the battery 21 through the resistor 30 and the armature 39, and the intial, transient armature current is limited by the resistor 30 before a counter electromotive force is established in the armature 39.

A voltage drop is produced across the resistor 30 by the flow of armature current, reducing the amount of the available voltage supplied by the battery 21 that is applied across the armature 39. Consequently, the motor torque developed is less than if full battery voltage were applied directly across the motor armature 39. The speed-torque characteristic of the motor 6 for this condition is graphically represented in FIG. 3 by the curve drawn between points A and B, a portion of which is shown as a dashed line for reasons that will become apparent. The value of the resistor 30 is chosen to produce a sufficient voltage drop so that the wheelchair will run in the "start" stage at a relatively low speed, but with sufficient torque for usual load conditions. Also, initial acceleration of the wheelchair 1 will be lower or "softer" for the comfort of the user, than if full battery voltage were applied across the motor armature 39.

For usual operation of the wheelchair 1 it is not intended that it be operated for any length of time in the "start" stage, because with the resistor 30 in the armature circuit the motor 6 can produce only a modest amount of torque. This is apparent from a comparison of curve A-B in FIG. 3 with the curve A-C, which depicts the motor speed-torque characteristic without the resistor 30 in the armature circuit. For curve A-C the motor armature 39 is connected directly across the battery 21, and by comparing curves A-B and A-C it is apparent that the insertion of the resistor 30 in the armature circuit substantially reduces the producible torque. For a load requiring a torque greater than at the point B, the motor 6 will not turn over when the resistor 30 is in the circuit, and for a given load less than the value at B the motor 6 will operate at a much slower speed when the resistor 30 is in the circuit, than when it is out of the circuit. This is illustrated by the points D and E on the graphs A-B and A-C respectively, which points typify the motor speed when the wheelchair 1 is driven on a level, substantially smooth surface with a normal person.

The large reduction in the producible motor torque in the "start" stage may result in an unsatisfactory wheelchair operation if it is driven on heavy carpeting or up a sharp incline, or is carrying an unusually heavy person. The motor 6 may stall out under such loading, or never initiate movement. Thus, a control circuit with a voltage absorbing resistor for obtaining desired start-up for normal loads does not serve as a normal wheelchair running stage.

Figure 3:
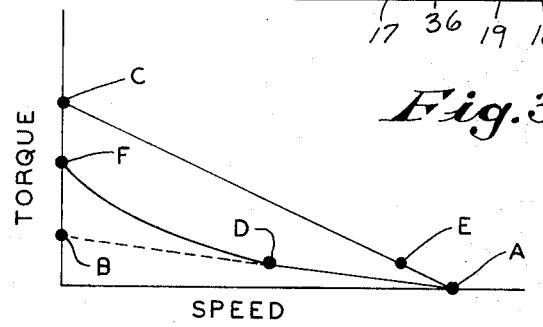
FIG. 3 is a graphic representation of the speed-torque operation curves of a D.C. motor controlled by the motor speed control.

To energize the motor 6 to the "low speed" stage, the rod-like speed control member 13 is depressed to operate the normally open switch 16 for closing the contacts 32, 33. This connects the string of diodes 34 in parallel with the resistor 30. The diode 34 now act as a voltage responsive gating device that does not conduct current until it is sufficiently forward biased. The number of diodes 34 is specifically chosen so that the total voltage required to cause them to conduct matches a voltage drop that appears across the resistor 30 under some normal load. Thus, the diodes 34 initially conduct when the resistor voltage is at some appreciable value, such as occurs when the point of operation on the curve A-B of FIG. 3 is in the dashed region D-B. Even though the switch 16 is closed, the motor armature current will flow only through the resistor 30, and the voltage drop across the resistor 30 will govern operation, so long as the wheelchair 1 is run on a surface and with a person that presents a relatively light load. Accordingly, the curve portion A-D represents motor operation with the resistor 30 functioning as the control element, and the curve portion D-F represents operation of the motor 6 after the diodes 34 have begun to conduct current. The forward biased, current conducting diodes 34 now act as a shunt around the resistor 30 to conduct a share of the armature current, and they also maintain the voltage absorbed by the parallel circuit of resistor 30 and diodes 34 at a low level, so that armature current and motor torque rise above that which would occur if the resistor 30 were the sole voltage absorbing control element. The transition of the diodes 34 from a substantially nonconducting state to a conducting state is a nonlinear function, in which voltage changes very little with changes in current, and this produces the curve portion D-F which deviates from the curve D-B. The addition of the diodes 34 has the operative effect of minimizing the presence of the resistor 30 when larger loads are imposed on the motor 6, and of making the voltage available for the armature at a higher level as load currents increase. As a result, the maximum producible torque for the motor 6 rises significantly, as indicated by the curve D-F.

Although motor speed control might be achieved by employing only the diodes 34 in the armature circuit, without the resistor 30, use of the resistor 30 is desirable to allow limited armature current before any counter electro-motive force is developed, and also to obtain a motor torque at normal loads with no or only a small amount of diode conduction. This results in fewer required diodes, less heat sink for the diodes, and therefore a more economical circuit. In design of a control circuit for a wheelchair the forward voltage drop across the diodes 34 at which conduction occurs is preferably selected to match a typical voltage drop across the resistor 30 for a normal load. This may preferably be about 40 percent of the D.C. source voltage, or of the maximum voltage that appears across the resistor 30 for a stall condition of the motor 6. At that point the diodes will commence to conduct some of the load current, and the non-linear characteristic of the diodes 34 will give the rising curve portion D-F.

When desired, the speed of the wheelchair may be increased by utilizing the "high speed" stage of operation. This is accomplished by depressing the speed control member 13 to operate the switch 17, and close the contacts 35, 36. The lead 40 now shorts the resistor 30 and the diodes 34, and the battery 21 is connected directly across the motor armature 39. The entire battery voltage is available to drive the motor 6, and the motor 6 operates on the curve A-C of FIG. 3. The use of the "high speed" stage of operation may be prohibited by swinging the lever tip 19 under the rod-like member 13. This would normally be done when the user of the apparatus is infirm, although there may be other reasons for not permitting direct connection of the voltage source 21 to the motor 6. Even though direct connection may be prohibited, the diode string 34 will still permit the development of substantial torque at very low speeds, as indicated by the point F in FIG. 3, and thus provide operation for all but the larger loads even though direct connection of the battery 21 to the motor 6 is locked out.

When the manual speed control member 13 is released, and the spring 14 returns it to the position shown in FIG. 2, the normally closed contact 24 of the switch 15 is reconnected with the movable contact 29. This places lead 25 in the active circuit, and removes the battery 21 from connection with the motor 6. The lead 25 connects the resistor 30 across the motor armature 39 to establish a dynamic braking circuit, which will decelerate the wheelchair 1. By proper selection of the resistor 30, the deceleration may be smooth without abrupt change in speed that would, or could be upsetting to the user. It is a particular finding that a resistor 30 that functions well for controlling the speed-torque characteristics of the motor 6 also provides good dynamic braking characteristics. Hence, only a single resistance branch and only a single diode branch need be used for obtaining control of a permanent magnet, fixed field D.C. motor. For example, a 1/10 horsepower D.C. motor operated from a 12 volt battery may be controlled by a one ohm dropping resistor and a train of five diodes each having a breakdown voltage of approximately one volt. Or, in place of a diode string a single zener diode with the same voltage breakdown characteristic may be selected.

The circuit breaker 22 is adjusted to open the battery circuit when a long term, excessive current is drawn from the battery 21. This could occur when the wheelchair 1 is stalled against an obstacle, or when an attempt is made to climb an excessively steep incline. The location of the circuit breaker 22 is such that an opening of the battery circuit will not interfere with the dynamic braking that occurs when the operating member 13 is released.

The present invention furnishes a motor speed control that provides not only two speed motor control, but also an initial motor energization stage to provide smooth wheelchair driving action. By the initial inclusion of a resistor in the armature circuit, current surge may be limited before a counter electro-motive force is developed in the motor armature, to prevent abrupt acceleration. A voltage responsive, non-linear, current conducting, gating device, such as a diode string, is brought into shunting relation with the resistor to limit the voltage absorbed by the control circuit elements to obtain a unique low speed-torque relation for the motor. The circuit provides a high resistance for low loads, and automatically a low effective resistance for the larger loads. Thus, a D.C. motor control is provided that is economical and that uses only few parts that are durable and trouble free in nature.

I claim:

1. In a speed control for a D.C. motor energized by a D.C. source, the combination comprising:
   a voltage dropping resistor;
   first switching means connecting said resistor in circuit with the motor and the D.C. source upon operation thereof;
   a voltage responsive, non-linear, current conducting, gating device;
   second switching means connecting said gating device in shunt relation to said resistor, to place said shunt connected resistor and gating device in series circuit relation with the motor and the D.C. source, upon operation thereof; and
   third switching means connecting the D.C. source across the motor, with said resistor and said gating device circumvented thereby, upon operation thereof.

2. A speed control as in claim 1, having additional switching means connecting said resistor across the motor in dynamic braking relationships upon the other switching means removing the D.C. source from connection with the motor.

3. A speed control as in claim 1, wherein said gating device is a series of diodes having a total threshold voltage for forward conduction the matches a resistor voltage drop that occurs upon an intended normal load on the motor.

4. In a speed control for a D.C. motor energized by a D.C. source, the combination comprising:
   a plurality of normally open switching elements;
   a resistor connected in series with the motor and the D.C. source upon closure of one of said switching elements;
   a voltage stabilizing gating device electrically connected into series with the motor and the D.C. source, and also in parallel with said resistor upon closure of a second one of said switching elements, said gating device sharing motor load current with said resistor and conducting current at voltages greater than those that occur at some intended normal load condition; and
   a shorting lead electrically connected around said resistor and said gating device upon closure of a third of said switching elements.

5. A speed control as in claim 4, wherein said gating device is a series of diodes.

6. A speed control as in claim 5, wherein said series of diodes commence to conduct at a voltage about 40 percent of the D.C. source voltage.

7. A speed control as in claim 6, wherein there is a reversing switch between the motor and the parallel resistor and diodes.

8. In a speed control for a D.C. motor energized by a D.C. source, the combination comprising:
   a voltage absorbing resistive element;
   circuit connections including a first switching element connecting said resistive element in series with the motor and the D.C. source upon actuation of the switching element;
   a voltage responsive gating device that conducts upon a threshold voltage of approximately 40 percent of the voltage across said resistive element occurring upon a motor stall condition; and
   additional circuit connections including a second switching element for connecting said gating device in shunt relation with said resistive element to thereby position said shunt connected resistive element and gating device in series circuit relation with the motor and D.C. source.

9. In a speed control for a D.C. motor energized by a D.C. source, the combination comprising:
   a manually operable speed selector means having a switch actuating portion movable from and to a deenergizing position;
   a plurality of normally open switching elements electrically connected to one another and physically aligned with one alongside the other and with operating heads in the path of travel of said switch actuation portion, which series of switching elements is electrically positioned between said D.C. source and the armature of said D.C. motor;
   at least one resistive element electrically connected in series with the armature of said D.C. motor upon actuation of one of said switching elements by said speed selector means;
   at least one voltage responsive gating device electrically connected in parallel with said resistive element and serially with the motor upon the actuation of another of said switching elements by said speed selector means, said gating device conducting and sharing load current with said resistive element upon a voltage appearing across that device that occurs for the lower values of motor speeds; and
   a low resistance shunt line electrically connected in parallel with said resistive element and said gating device upon actuation of still another of said switching elements.

10. A control as in claim 9, wherein said switching elements place said resistive element in series with said motor armature upon return of said switch actuating portion of said speed selector means to said deenergizing position.

* * * * *